United States Patent [19]
Simonett et al.

[11] Patent Number: 5,988,878
[45] Date of Patent: Nov. 23, 1999

[54] EXPANDABLE BAG, ESPECIALLY FOR BICYCLE RACKS

[76] Inventors: Bernard Theodore Simonett, P.O. Box 2177, Vail, Colo. 81658; Margaret Mary Quinn, P.O. Box 474, Conifer, Colo. 80433

[21] Appl. No.: 08/947,373

[22] Filed: Oct. 8, 1997

Related U.S. Application Data

[60] Provisional application No. 60/028,521, Oct. 18, 1996.
[51] Int. Cl.$^6$ .................................................. B65D 30/20
[52] U.S. Cl. .............................. 383/2; 383/38; 383/119; 383/120; 383/121
[58] Field of Search .................................. 383/2, 38, 39, 383/119, 120, 121; 190/103, 104, 105

[56] References Cited

U.S. PATENT DOCUMENTS

| | | | |
|---|---|---|---|
| 790,194 | 5/1905 | Douglass et al. | 383/2 X |
| 1,703,620 | 2/1929 | Hamilton | 383/2 X |
| 2,729,257 | 1/1956 | Kepper | 383/2 |
| 4,361,215 | 11/1982 | Sawai | 383/2 X |
| 4,466,124 | 8/1984 | Kirkham, Jr. | 383/2 |
| 4,733,759 | 3/1988 | Shih-Chen | 383/2 X |
| 5,228,546 | 7/1993 | Chang et al. | 383/2 X |

Primary Examiner—Jes F. Pascula

[57] ABSTRACT

A bag adapted to be changed from a predetermined larger size into a predetermined smaller size and vice versa, has a front, rear side and bottom panels and readily disengageable fasteners in predetermined positions on the panels so that by folding the panels, the smaller size bag can be realized by engaging the readily disconnectable fasteners.

47 Claims, 6 Drawing Sheets

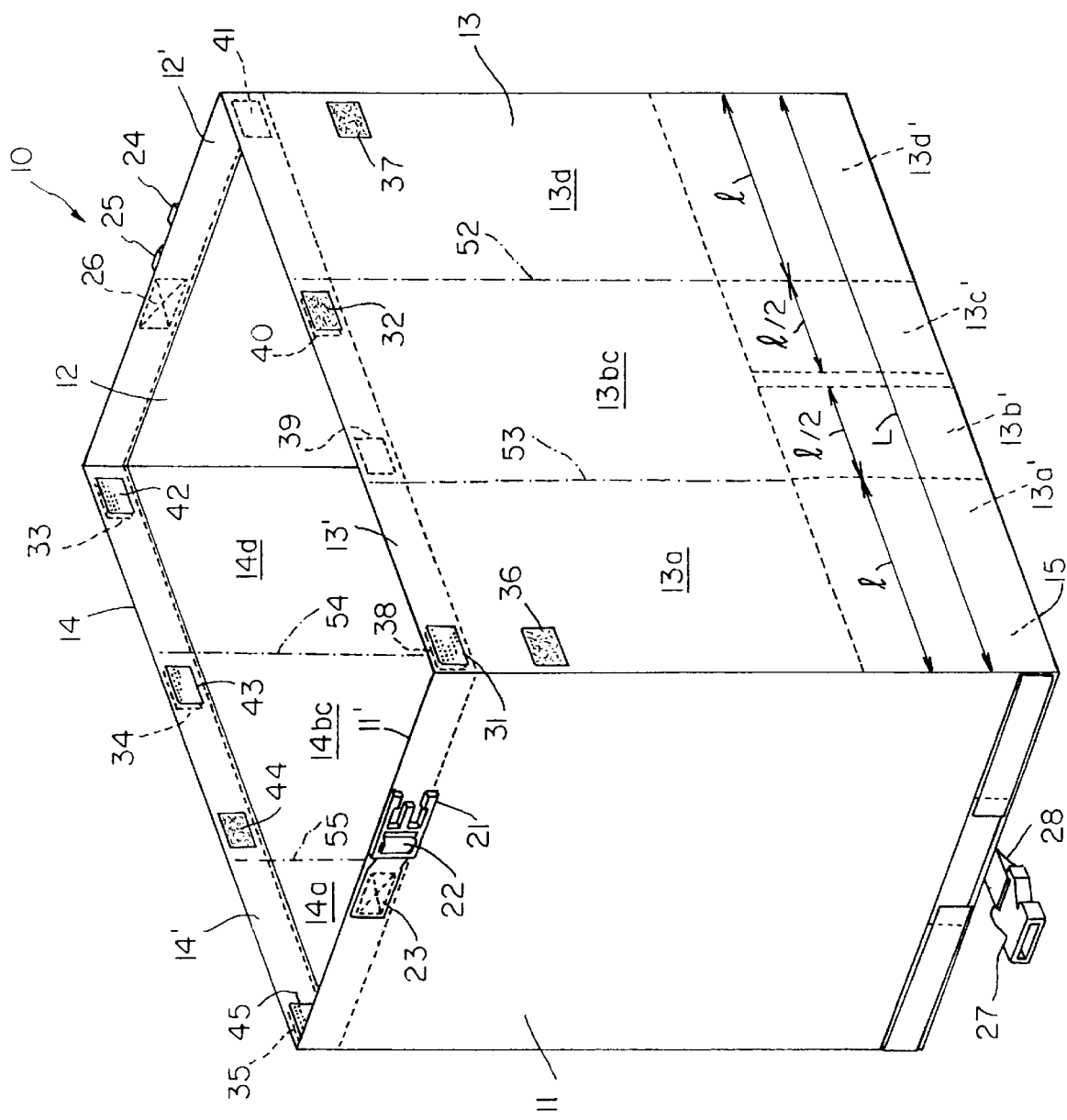

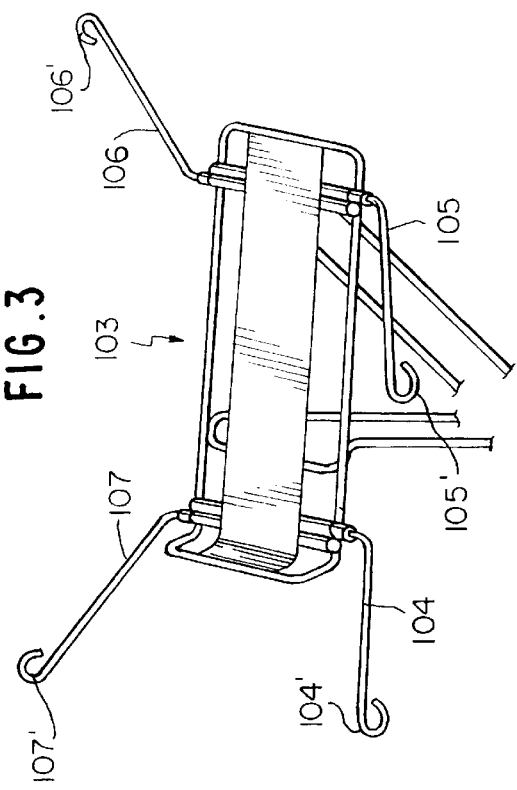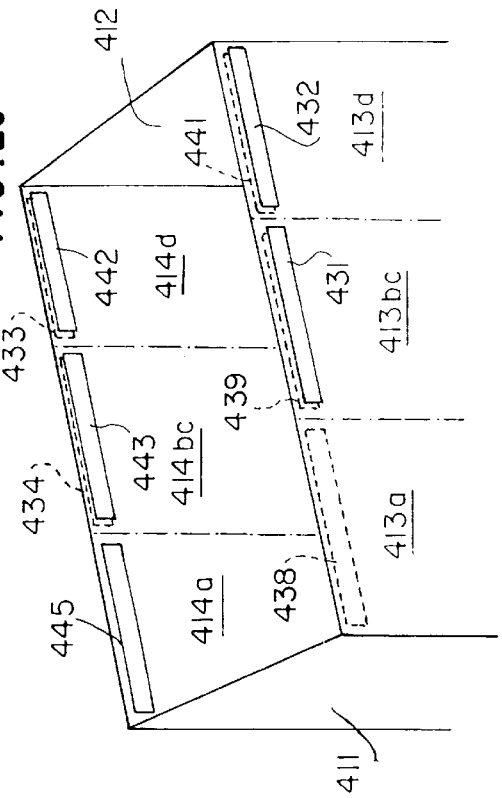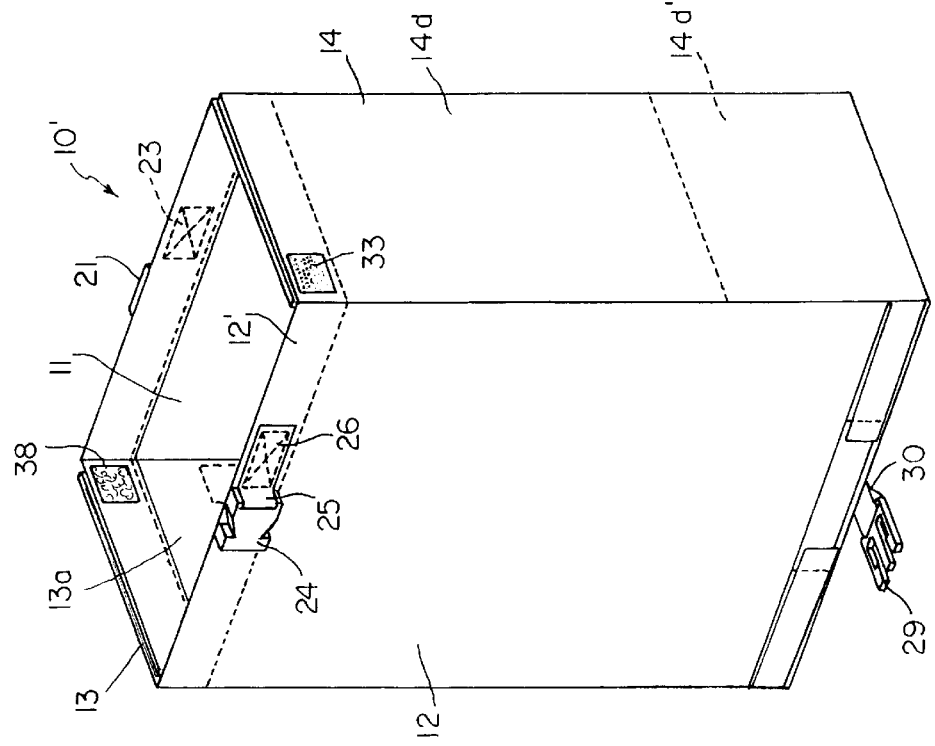

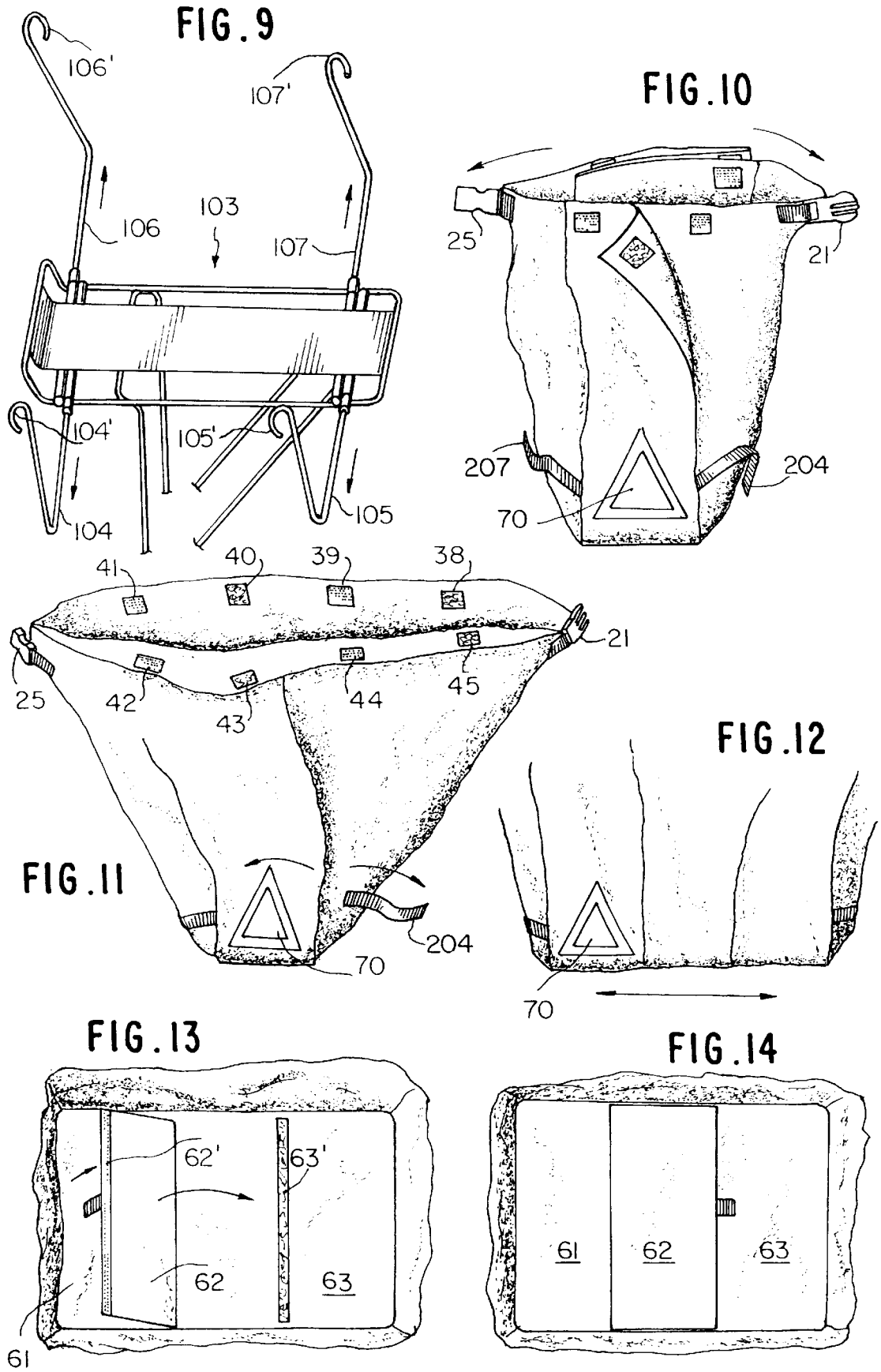

EXPANDABLE BAG, ESPECIALLY FOR BICYCLE RACKS

This application claims benefit of Provisional Application 60/028,521 filed Oct. 18, 1996.

FIELD OF INVENTION

This invention relates to an expandable bag, especially to an expandable bag for use with an expandable bicycle rack mounted over the rear wheel of a bicycle.

BACKGROUND OF THE INVENTION

Bags of various sizes are known in the art which, for the most part, are of a predetermined fixed size. However, it is desirable in many instances to have a bag which can be used either in a larger size or in a smaller size. If one is to shop or pack only a limited number and/or amounts of goods, it is more convenient to have a bag of smaller size. By contrast, if the bag is to hold a large amount of items, a bag of larger size is desirable which can be readily changed back to the smaller size as the need arises.

An expandable bag is particularly useful with a so-called "LOAD LLAMA"™ bicycle rack mounted over the rear wheel of a bicycle which has an adjustable support area for goods to be carried on the bicycle rack. The so-called "LOAD LLAMA"™ bicycle rack, which is commercially available, incorporates the adjusting features of U.S. Pat. Nos. 5,217,149 and 5,222,639 as well as additional features described in U.S. Pat. No. 5,655,676. As disclosed in the aforementioned U.S. Pat. No. 5,655,676, the rotatable and axially extendable L-shaped support arms can be axially adjusted between an axially fully retracted position providing a minimum width support area position on the rack and an axially maximum extended position providing a maximum width support area position on the rack by limiting the maximum extension of the support arms in the axial direction thereof.

SUMMARY OF THE INVENTION

It is an object of this invention to provide an expandable bag, especially for bicycle racks, which offers two discrete sizes and can be readily converted from one size to the other.

A further object of the invention resides in a bag which offers a relatively large ratio of about 3:1 for its two bag sizes obtainable by simple manipulations.

A further object of the present invention resides in a bag of the type described above particularly adapted for a so-called "LOAD LLAMA"™ bicycle rack.

The expandable bag according to this invention consists of a number of panels provided with Velcro® fasteners which, when connected in a certain manner, will form the smaller size bag by folding side panels in overlapping relationship and sliding parts of the bottom of the full size bag over the bottom part of the smaller size bag in such a manner that folded-up side panels of the full size bag realized by the Velcro® connections come to lie on the inside of the reduced size bag. By disconnecting the Velcro® connections, the bag may then be readily expanded to its larger size by pulling out again the bottom parts previously slid over the bottom part of the reduced size bag, whereby the larger size preferably coincides with and fits the maximum axial extensions of the support arms in the "LOAD LLAMA"™ bicycle rack while the reduced size bag preferably coincides with and fits the minimum axial extension of the support arms of a "LOAD LLAMA"™ bicycle rack.

The reduced bag size is preferably also of such width and length that it will also fit on conventional bicycle racks, whereby the reduced bag need not necessarily correspond exactly to the fully retracted position of the support arms of a "LOAD LLAMA"™ bicycle rack but may have a width intermediate the axially fully extended position and the axially fully retracted position of the support arms.

According to another feature of the expandable bag in accordance with one embodiment of this invention, the bag may also be closed at the top in such a manner as to provide a convenient handle or shoulder strap.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a perspective view of one embodiment of the expandable bag of this invention, showing the bag in the fully expanded condition;

FIG. 2 is a perspective view of the expandable bag of FIG. 1 in the reduced size condition;

FIG. 3 is a somewhat schematic perspective view of a "LOAD LLAMA"™ bicycle rack with the support arms in the axially retracted position;

FIG. 9 is a somewhat schematic perspective view showing the "LOAD LLAMA"™ bicycle rack with its support arms in the axially fully extended position;

FIG. 10 is a somewhat schematic perspective view illustrating the first step for changing the reduced size bag of FIG. 7 into its full-sized condition;

FIG. 11 is a somewhat schematic perspective view indicating the next steps for converting the previously reduced-size bag of FIG. 10 into the large-sized bag;

FIG. 12 is a somewhat schematic partial side view, further indicating the next step for converting the small-sized bag into the large-sized bag;

FIGS. 13 and 14 are somewhat schematic top plan views looking at the bottom in the interior of the large-sized bag and indicating the manipulation necessary to provide a firm bottom for the full-size bag;

FIG. 25 is a partial perspective view of a slightly modified embodiment of a bag, similar to FIGS. 4–24.

DETAILED DESCRIPTION OF THE DRAWINGS

Figure 5:
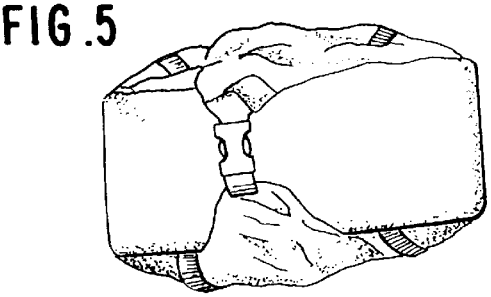
FIG. 5 is a somewhat schematic bottom view of the reduced-size bag of FIG. 4.
Figure 4:
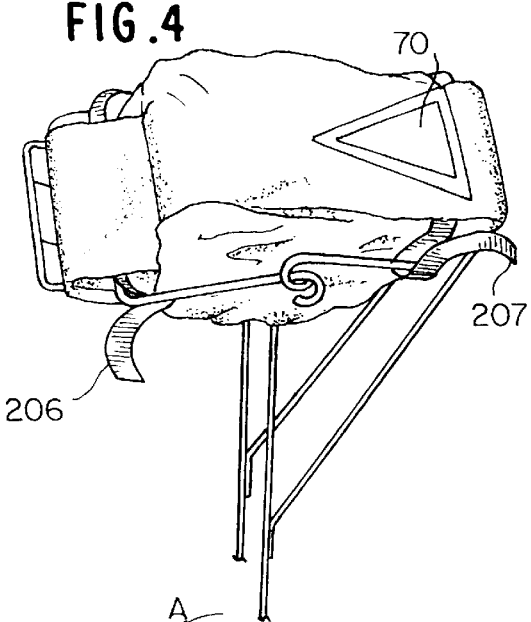
FIG. 4 is a somewhat schematic perspective view showing the reduced size bag of a slightly modified embodiment as folded-together to fit on the bicycle rack of FIG. 3.

The various embodiments illustrated in the several figures of the drawing differ only slightly as follows. The slide release fasteners 27, 28 and 29, 30 of FIGS. 1 and 2 are omitted in FIGS. 4–25 which, differing from FIGS. 1 and 2, include engageable and disconnectable straps 104, 105, 106 and 107 to engage with the shorter arms of the L-shaped support arms 104, 105, 106 and 107 while FIG. 25 differs from FIGS. 1–24 by the use of longer Velcro® strips in lieu of Velcro® patches as will be described more fully hereinafter.

Referring now to the drawing wherein like reference numerals are used throughout the various views to designate like parts, and more particularly to FIG. 1, the fill-size bag generally designated by reference numeral 10 includes a front panel 11, a rear panel 12 and two side panels 13 and 14 as well as a bottom panel 15. The front, rear and side panels 11, 12, 13 and 14 are thereby folded back inwardly at the top to form narrow double-thickness hem-like bands 11', 12', 13' and 14' reinforced for fastening thereto Velcro® patches as will be explained more fully hereinafter. The bag is also provided with complementary slide release buckles consisting, respectively, of a male member 21 supported on a looped strap 22 secured externally to the reinforced band portion 11' of panel 11 at 23 and of a complementary female member 24 mounted on a looped strap 25 and mounted externally on the reinforced band portion 12' of panel 12. Another slide fastener female member 27 (FIG. 1) mounted on a looped strap 28 is thereby secured in the bottom area of panel 11 substantially in the center on the inside of the bag, for example, between overlapping sewn-together ends of the panels 11 and 15 or in any other conventional manner. A slide fastener male member 29 (FIG. 2) thereby extends from panel 12 on the opposite end, supported on looped band strap 30 and fastened in a similar manner on the inside of the panel 12.

As viewed in FIG. 1, each side panel 13 and 14 includes four stiffening pockets 13a', 13b', 13c' and 13d' and 14a', 14b', 14c' and 14d' (not shown) defining panel portions 13a, 13bc, 13d and 14a, 14bc and 14d delimited by imaginary fold lines 52, 53, 54, 55, of which panel portions 13a and 13d (and 14a and 14d) each have a length "l" of about one-third the overall length L while each stiffening pocket 13b', 13c' (and 14b', 14c') each have a length of about ½ "l" so that imaginary panel portions 13bc and 14bc also have a length of "l." The stiffening pockets 13a', 13b', 13c', 13d' and 14a', 14b', 14c' and 14d' which contain a plastic stiffening sheet-material of any known type may be sewn to panels 13 and 14 on the inside of the bag and closed off during this sewing operation after the stiffening material has been inserted. The purpose of these stiffening pockets 13a'–13d' and 14a'–14d' which may have a height depending on the inside depth of the bag is to facilitate folding of panels 13 and 14 in a predetermined manner when changing over from the full-size bag 10 to the reduced-size bag 10', as will become more apparent hereinafter. It is understood that the panel portions 13a, 13bc, and 13d as also 14a, 14bc and 14d, which form the sides of the full size bag and are made from integral material, do not exist as separate panel portions but are described herein only as such to explain the expandable bag, though, of course, they may also be formed of separate, sewn-together panel portions.

Figure 15:
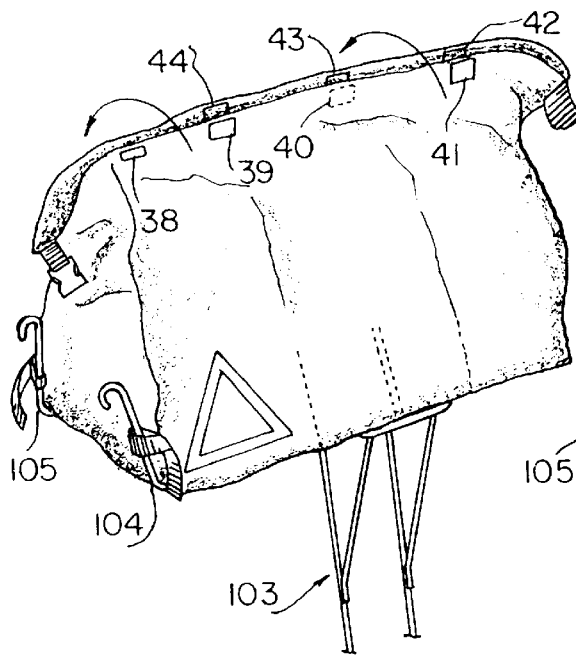
FIG. 15 is a somewhat schematic perspective view showing the bag in the expanded position installed on the bicycle rack and the top closed by rolling-in and readied for the installation of a shoulder strap.
Figure 16:
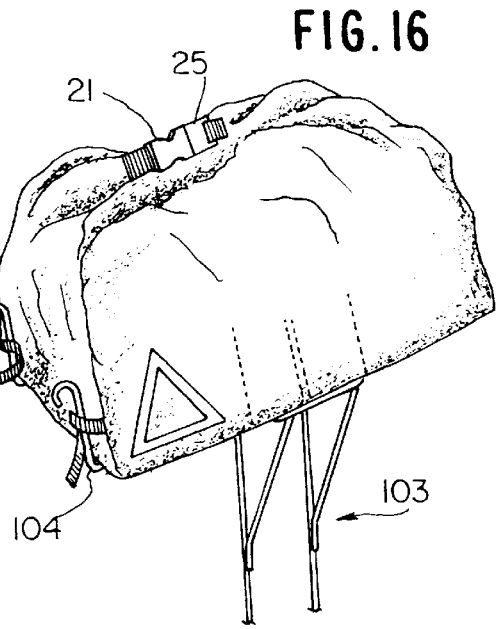
FIG. 16 is a somewhat perspective view showing the full-size bag of FIG. 15 in the closed condition but without shoulder strap.

A Velcro® patch 31 is secured in the left corner area of band portion 13' of side panel portion 13a on the outside thereof as viewed in FIG. 1. Another Velcro® patch 32 is secured to the band portion 13' of side panel potion 13bc on the outside thereof and to the left of an imaginary fold line 52 schematically indicated in dash-and-dotted lines. Still another Velcro® patch 33 is secured to the band portion 14' of side panel portion 14d on the outside thereof and in the right corner area as viewed in FIG. 1, while another Velcro® patch 34 is secured to the band portion 14' of the side panel portion 14bc on the outside thereof and to the left of imaginary fold line 54 and a further Velcro® patch 35 is secured to the band portion 14' of side panel portion 14a on the outside thereof and in the left corner thereof as viewed in FIG. 1. Another Velcro® patch 36 is secured to the outside of side panel portion 13a underneath Velcro® patch 31 and a further Velcro® patch 37 is secured to the outside of side panel portion 13d within the right corner area thereof at about the same level as Velcro® patch 36. A Velcro® patch 38 is secured to the inside of the band portion 13' within the area coinciding with the Velcro® patch 31. Another Velcro® patch 39 is secured to band portion 13' of side panel potion 13bc on the inside thereof and to the right of an imaginary fold line 53. Still another Velcro® patch 40, coinciding with the area of Velcro® patch 32 is secured to band portion 13' of side panel portion 13bc on the inside thereof while a further Velcro® patch 41 is secured to the band portion 13' of side panel portion 13d on the inside thereof and within the right-hand corner as viewed in FIG. 1, approximately above Velcro® patch 37. A Velcro® patch 42 is secured to band portion 14' of side panel portion 14d on the inside thereof and within the area of Velcro® patch 33, another Velcro® patch 43 coinciding with the area of the Velcro® patch 34 is secured to the inside of band portion 14' of side panel portion 14bc, a still further Velcro® patch 44 is secured to the inside of band portion 14' of side panel portion 14bc to the right of fold line 55 and finally a Velcro® patch 45 is secured to the left inside corner of band portion 14' of side panel portion 14a. Velcro® patches 43 and 44 are thereby located relative to imaginary fold lines 54 and 55 in a manner similar to Velcro® patches 39 and 40 with respect to imaginary fold lines 52 and 53. The inside of the bottom 15 includes three bottom stiffening pockets 61, 62 and 63 (FIGS. 13 and 14) which may be of a construction similar to the stiffening pockets in the side panels 13 and 14, whereby the bottom stiffening pockets 61 and 63 are fixedly secured to the bottom panel 15 while bottom stiffening pocket 62 is adapted to be swung from a left overlapping position assumed in the reduced size bag to a right position as shown in FIG. 13 to provide for a flush stiffened bottom for the entire bottom area of the full-size bag. The side of the bottom stiffening pocket 62 shown in FIG. 13 is thereby provided with a strip of Velcro® 62' along its edge area opposite the side forming its pivot axis and adapted to engage with the Velcro® strip 63' on the surface of fixed bottom stiffening pocket 63 to form the stiffened full-size bottom as shown in FIG. 14. FIGS. 15 and 16 illustrate the expanded bag mounted on the bicycle rack generally designated by reference numeral 103 with the L-shaped support arms 104, 105, 106, 107 in the axially fully extended position (FIG. 9), which is delimited as more fully described in the aforementioned U.S. Pat. No. 5,655,676. FIGS. 15 and 16 thereby show how the full-size bag can be closed at the top by engagement of Velcro® fastener 38 with Velcro® fastener 45, of Velcro® fastener 39 with Velcro® fastener 44, of Velcro® fastener 40 with Velcro® fastener 43 and of Velcro® fastener 41 with Velcro® fastener 42 and by rolling-in the upper ends of the bag and then connecting the same by slide fasteners 21 and 25 (FIG. 16). Of course, any other closing means as known to those skilled in the art, such as, for example, one or more zippers may also be used.

Figure 6:
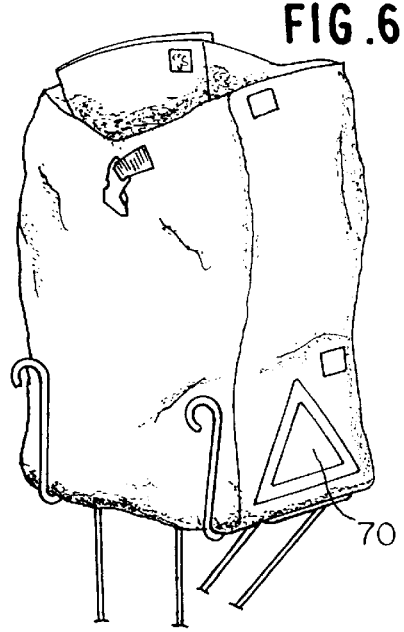
FIG. 6 is a somewhat schematic perspective view showing the reduced-size bag of FIG. 4 on the bicycle rack of FIG. 3 and open at the top for filling the same.
Figure 7:
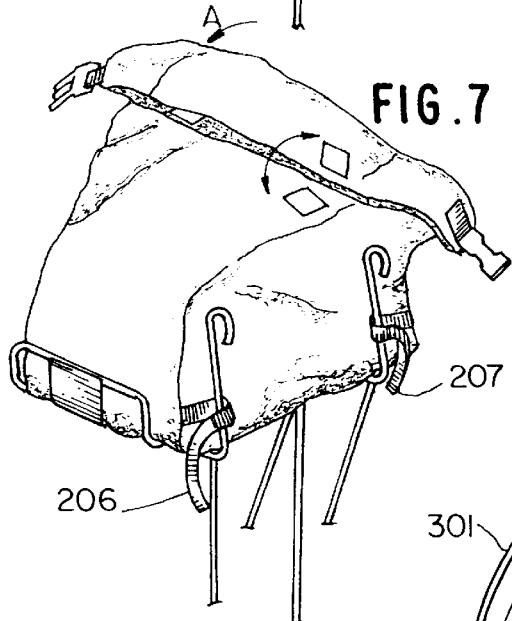
FIG. 7 is a somewhat schematic view showing the reduced size bag of FIG. 4 on the bicycle rack with the top closed by a rolling action and also indicating the Velcro® patches for closing the rolled-in bag to form a carrying handle.
Figure 8:
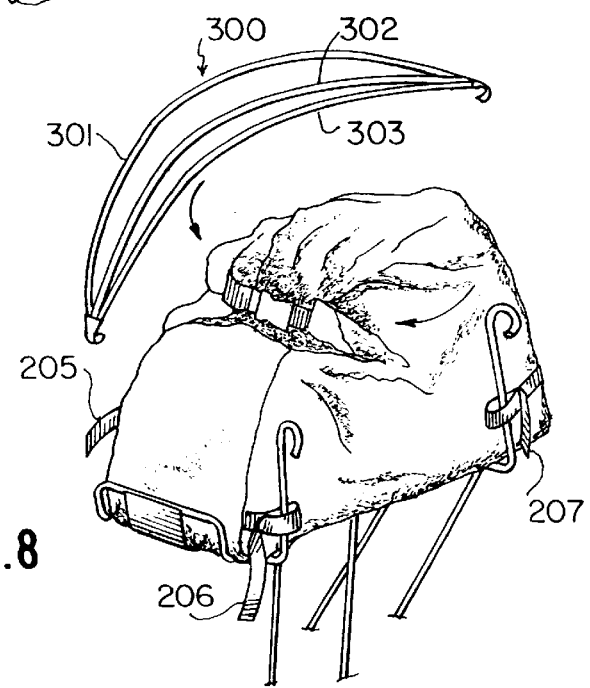
FIG. 8 is a somewhat schematic perspective view of the bag shown in FIG. 7 with the carrying handle and with a triple bungee cord for additionally securing the bag.
Figure 17:
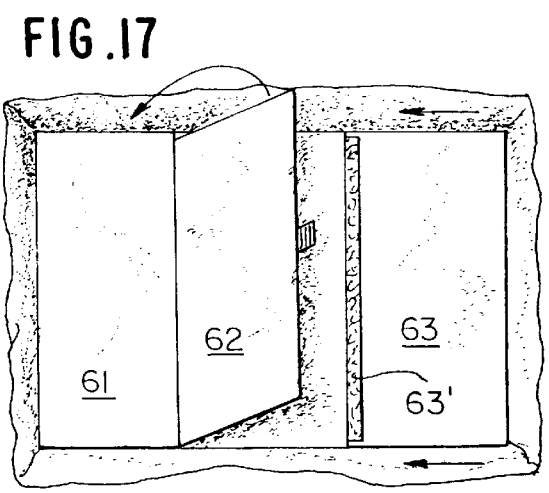
FIG. 17 is a somewhat perspective top plan view at the bottom of the full-size bag and indicating the first step for preparing the conversion to the reduced-size bag.
Figure 18:
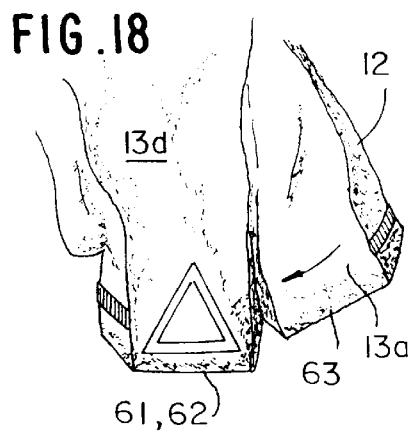
FIG. 18 is a somewhat schematic perspective front elevational view indicating the next step for converting the full-size bag to the reduced-size bag.
Figure 19:
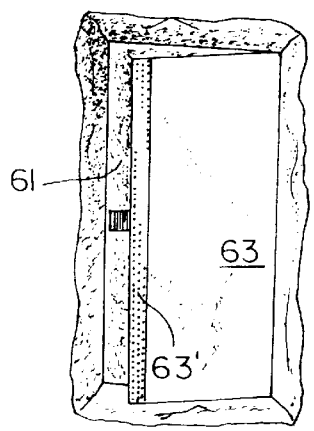
FIG. 19 is a somewhat schematic top plan view on the bottom of the reduced-size bag.
Figure 20:
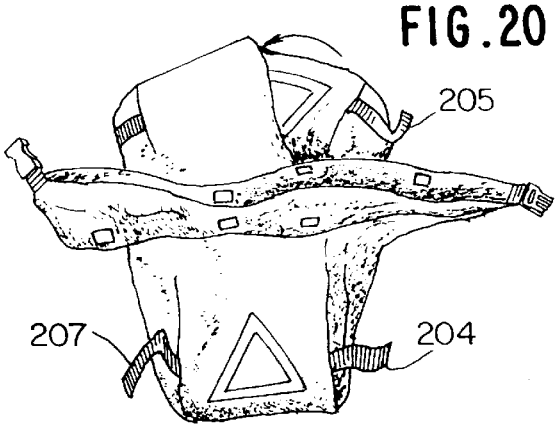
FIG. 20 is a somewhat schematic perspective front elevational view showing the condition of the bag during changeover to its reduced size.
Figure 21:
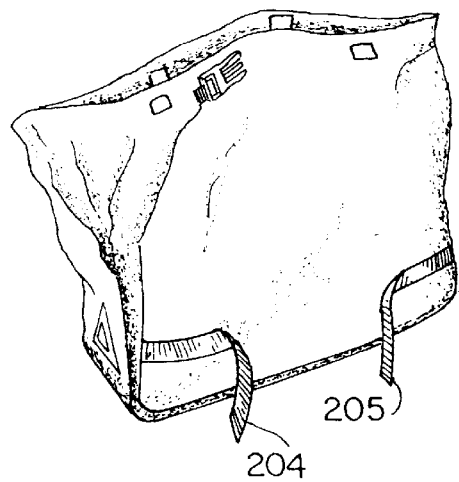
FIG. 21 is a somewhat schematic perspective view from the side indicating the next step for converting the full-size bag to the reduced size bag.
Figure 22:
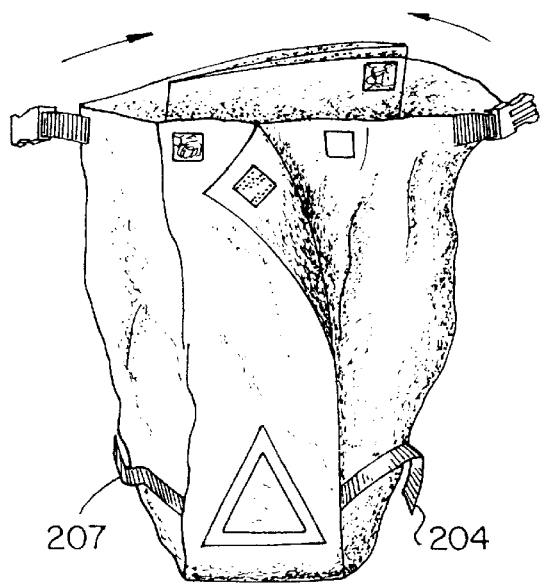
FIG. 22 is a somewhat schematic front elevational view indicating the next step for converting the full-size bag to the reduced-size bag.
Figure 23:
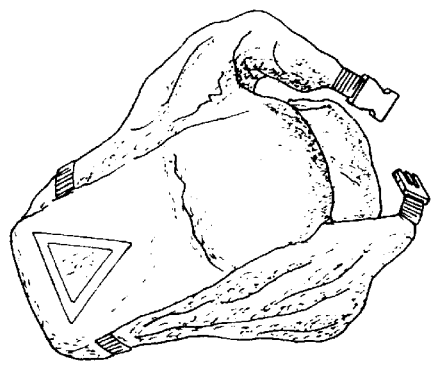
FIG. 23 is a perspective view of the folded-together and closed reduced-size bag.
Figure 24:
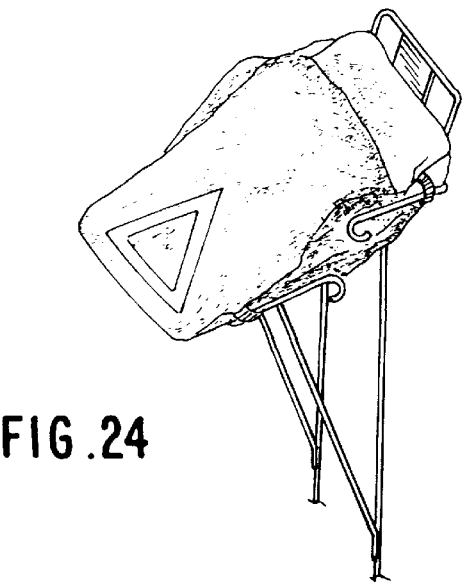
FIG. 24 is a perspective view showing the reduced-size bag on the bicycle rack.

To reduce the expanded bag to its reduced size, it is only necessary to undertake the following steps:

When the full-size bag is in its fully opened condition as shown in FIG. 1, at first the bottom stiffening pocket 62 is flipped over the bottom stiffening pocket 61 as shown in FIG. 17 to provide for a non-stiffened bottom area previously occupied by the stiffening pocket 62 so that this bottom area, previously occupied by the stiffening pocket 62 and now consisting only of flexible material, can be manipulated to allow the folding operation in the change-over from the full-size bag condition into the reduced-size bag condition. The Velcro® patch 42 is then connected with Velcro® patch 44, and the Velcro® patch 34 is connected with the Velcro® patch 35, causing panel portions 14d, 14bc and 14a to be folded-up in overlapping relationship. This prepares the reduction of side panel 14 to one-third its length by causing side panel portion 14c to overlap side panel portion 14bc and side panel portion 14bc to overlap side panel portion 14a. The next step is to connect the Velcro® patch 31 with the Velcro® patch 32 and to connect the Velcro® patch 39 with the Velcro® patch 41, thereby causing side panel portion 13bc to overlap side panel portion 13a and side panel portion 13d to overlap with side panel portion 13bc. The folded-together bottom portions 62 and 61 are thereby intended to come to lie under the fixed bottom portion 63. This is achieved with the thus folded-together side panel portions 13a, 13bc, 13d and 14a, 14bc, 14d and bottom panel portions 61, 62, 63 in that bottom portion 63 is pushed in over the folded-together bottom portions 61, 62 (FIG. 18) in such a manner that the smaller size bag is formed (FIG. 20) in which the folded-together side panel portions 13a, 13bc, 13d and 14a, 14bc, 14d now form the front and rear panels of the reduced-size bag while former front and rear panels 11 and 12 now form the side panels of the reduced-size bag. In other words, the front and rear panels 11 and 12 of the full-size bag 10 of FIG. 1 now become the side panels of the reduced size bag 10' of FIG. 2 whose front and rear panels are formed by overlapped side panel portions 13a, 13bc, 13d and 14a, 14bc, 14d. FIG. 6 illustrates the reduced size bag in its open condition on the bicycle rack with the support arms in their retracted position. By rolling-in the open top in a direction indicated by arrow A in FIG. 7, the slide release buckles 21 and 24 can be engaged to form a carrying strap (FIG. 8). To hold the parts in the closed condition and thereby facilitate the rolling operation, the Velcro® patch 33 is adapted to engage with Velcro® patch 37 whereby engagement of the complementary slide fasteners 21 and 24 form a carrying handle. A shoulder strap may also be formed by interconnecting with latching parts 21 and 24, a strap provided also with similar latching parts.

To reopen to full size, it is only necessary to proceed in the opposite manner, i.e. open the bag as shown in FIG. 10 by disconnecting the various Velcro® connections, pulling apart the bottom as indicated in FIGS. 11 and 12 and then flipping over the bottom stiffening pocket 62 as shown in FIGS. 13 and 14 to achieve the full-size stiffened bottom as shown in FIG. 14. If one then desires also a handle for carrying the full-size bag, it is only necessary to roll up again the open part and interconnect the latching members 21 and 24, as shown in FIGS. 15 and 16. The bag may additionally be provided with a strap which can be buckled together with latching members 21 and 24 to form a shoulder carrying bag as described with the reduced-size bag. The bottom stiffeners may be constituted by pockets filled with any appropriate known stiffening material, preferably with a plastic sheet material of any conventional type, such as polyethylene providing the required or desired stiffening.

The bag may be made of any suitable material such as 430 Denier Pack cloth and can be so dimensioned that it fits the smallest and largest platform size of a "LOAD LLAMA"™ bicycle rack. Of course, in its reduced size, the bag as described above may also be mounted in the usual manner on a conventional bicycle rack.

To hold the bag in either its expanded or reduced condition on the bicycle rack, a triple bungee strap 300 (FIG. 8) is used as described in the aforementioned patents. Furthermore, the bag may also be provided with other appropriate straps 204, 205, 206 and 207 (FIGS. 4–25) of any conventional material which are conventionally secured in appropriate places to the bag panels so as to be able to be disengageably secured around the shorter arms of the L-shaped support arms 9 to thereby hold the lower part of the bag onto the support arms by engaging around the L-shaped support arms 104, 105, 106, 107. In the alternative, the straps 204, 205, 206 and 207 may also be secured to the bag panels in such places as to permit engagement with the looped end portions 104', 105', 106', 107' with which normally engage the outside straps 301 and 303 of the triple strap bungee cord 300 engages. Small metal rings adapted to engage with the support arms may also be used in place of the straps. The straps are preferably of the readily disconnectable type with the use of Velcro® fasteners. However, any other fastening means, such as clips, etc. may also be used.

In one embodiment of this invention, the reduced-size bag 10' has a length of about 12½", a width of about 6½" and a height o about 19" while the expanded bag 10 has a length of about 19½", a width of about 12½" and a height of about 19". Of course, other sizes may be used as desired. Furthermore, the bag is not necessarily limited to its use on the bicycle rack, but may also be of interest for normal shopping or storing where a user of the bag may at times buy or store relatively few items in the bag and at other times seeks to accommodate a substantially larger number of items in the bag.

While the panels 11, 12, 13, 14 and 15 are each made of the same solid material in their entirety and sewn together in a conventional manner with pockets for stiffening materials sewn onto these panels, the panels may also be made of different materials, such as Nylon mesh in which case ribbing may be sewed onto the inside where needed, for example, where Velcro® patches are to be sewed on. In the alternative, these panels or some of them may also be made of different materials, for example, the lower part of solid material and the upper part of mesh material, or may be decorated in a conventional manner, for example by a decal 70 to indicate manufacturer or front end. Other plastic materials or even leather may also be used for the various panels provided they have the required foldability.

To facilitate the conversion from full-size bag to reduced-size bag, it is appropriate to use some indications assisting in the conversion from full-size bag to reduced-size bag. For example, Velcro® patches to be connected may be appropriately labelled by corresponding numbers, possibly with appropriate suffixes to indicate which fasteners are to be connected. In the alternative, Velcro® patches to be connected can also be color-coded by using colored Velcro® patches of the same color for those to be interconnected. FIG. 25, in which similar reference numerals of the 400-series are used to designate similar parts, shows such an arrangement in which Velcro® strips extending over nearly the entire width of a side panel portion are used. In this embodiment, Velcro® strips 431 and 432 on the outside of side panel portions 413*bc* and 413*d* may be blue, while Velcro® strips 438 and 439 on the inside of side panel portions 413*a* and 413*bc* may be yellow. Similarly, Velcro® strips 433 and 434 on the outside of side panel portions 414*d* and 414*bc* may again be blue, and Velcro® strips 443 and 442 on the inside of side panel portions 414*d* and 414*bc* may again be yellow. The Velcro® strips 438 and 445 on the inside of side panel portions 413*a* and 414*a* which are connected to close the open top, may be white.

While we have shown and described only one embodiment in accordance with the present invention, it is understood that the same is not limited thereto but is susceptible of numerous changes and modifications as known to those skilled in the art. For example, in lieu of preferred Velcro® fasteners, also other types of readily disengageable fasteners, such as snap-button fasteners may be used. Furthermore, the disengageable strip features of FIGS. 4–25 may also be used in the embodiment of FIGS. 1 and 2, while slide fasteners similar to slide fasteners 27, 29 of FIGS. 1 and 2 may also be used in the other embodiments. We therefore do not wish to be limited to the details shown and described herein but intend to cover all such modifications as are encompassed by the scope of the appended claims.

We claim:

1. A bag adapted to be changed at will from a predetermined larger size into a predetermined smaller size and vice versa, which comprises a plurality of panel means including a front panel, a rear panel, two side panels and a bottom panel, disengageable connecting means on said panel means for increasing and again decreasing the size of the bag by disengaging and re-engaging again the connecting means including means for so folding some of said panel means that the predetermined smaller size bag is realized by folding some of said panel means in overlapping relationship and by re-engagig said connecting means, whereby said side panels are of larger two-dimensional area than said front and rear panels in the unfolded larger bag size condition and wherein the side panels occupy a smaller two-dimensional area than said front and rear panels in the folded-together smaller bag size condition.

2. A bag according to claim 1, wherein the predetermined larger size bag is realized by disengaging said connecting means during unfolding of said panel means and the smaller size bag is realized by re-engaging said connecting means and folding again some of said panel means in overlapping relationship.

3. A bag according to claim 1, wherein said front, rear and side panels form a bag of substantially rectangular configuration as viewed in plan view.

4. A bag according to claim 3, wherein each of said panels is of substantially rectangular shape.

5. A bag according to claim 1, wherein said side panels include stiffening means.

6. A bag according to claim 5, wherein said stiffening means includes a number of stiffening pockets operable to receive stiffening members and operable to form fold lines.

7. A bag according to claim 6, wherein each side panel has four stiffening pockets including two innermost mutually adjacent stiffening pockets which are each about one-half the size of each of the two other stiffening pockets disposed on opposite sides of the two innermost stiffening pockets.

8. A bag according to claim 6, wherein said stiffening pockets have a height smaller than the height of said side panels.

9. A bag according to claim 6, wherein said stiffening members are made of stiffening sheet material.

10. A bag according to claim 1, wherein said bottom panel includes a number of stiffening pockets.

11. A bag according to claim 10, wherein one of the bottom stiffening pockets is pivotally secured to the bottom panel while at least another bottom stiffening pocket adjacent said one stiffening pocket is substantially fixedly secured to said bottom panel so that said one bottom stiffening pocket can be pivoted from a position adjacent the at least another bottom stiffening pocket corresponding to the larger size bag condition to overlap with said at least another bottom stiffening pocket in the smaller size bag condition.

12. A bag according to claim 11, wherein said one bottom stiffening pocket is located between two other bottom stiffening pockets.

13. A bag according to claim 11, wherein three bottom stiffening pockets are provided which are at least of approximately the same dimensions.

14. A bag according to claim 11, wherein said one bottom stiffening pocket is provided with disengageable connecting means along its edge area opposite the side forming the pivot axis and adapted to engage with a disengageable connecting means provided on the surface of the bottom stiffening pocket next to said edge area.

15. A bag according to claim 1, wherein the disengageable connecting means are operable to effect an increase of the bag from the smaller size to the larger size which is at least double the smaller size.

16. A bag according to claim 1, wherein upon disengagement of said connecting means the panel means forming the side panels of the smaller bag size become the front and rear panels of the larger bag size.

17. A bag according to claim 16, wherein the front and rear panels of the smaller size bag are formed by overlapping folded-over panel means which, unfolded upon disengagement of said connecting means, form the side panels of the larger size bag.

18. A bag according to claim 1, wherein the front and rear panels of the smaller size bag are formed by overlapping folded-over panel means which, unfolded upon disengagement of said connecting means, form the side panels of the larger size bag.

19. A multi-dimensional bag according to claim 1, wherein some of said panel means are folded in overlapping relationship in the smaller size bag while others of the panel means are in non-folded condition in the smaller size bag and extend over a substantially entire dimension of the multi-dimensional bag.

20. A multi-dimensional bag according to claim 1, wherein the size of one entire dimension of the bag is effectively reduced in the smaller size bag by complete overlap of some of the panel means.

21. A multi-dimensional bag of substantially rectangular shape according to claim 1, wherein the size of two oppositely disposed sides of the bag are effectively reduced in the smaller bag size by substantially complete overlap of some of the panel means.

22. A bag according to claim 1, wherein the bag is open at the top in both smaller and larger size and includes further means for closing the bag in both smaller and larger sizes by rolling-in the panel means in one of the two rectangular dimensions.

23. A bag according to claim 1, wherein the front and rear panels in the smaller size bag are constituted by folded-over panel means each provided with disengageable connecting means forming, with the panel means unfolded the side panels in the larger size bag.

24. A bag according to claim 23, wherein said front and rear panels are in the smaller bag size constituted by three folded-over panel means, of which one outer panel means is provided with two connecting means on the outside thereof, the center panel means is provided with one connecting means on the inside thereof and with another connecting means on the outside thereof, and wherein the other outer panel means is provided with two connecting means, one of which is located on the inside thereof and the other of which is located on the outside thereof.

25. A bag according to claim 24, wherein the two connecting means on the one outer panel means are disposed substantially one above the other and more remote from the center panel means, wherein the two connecting means on the center panel means are located at substantially the same height as the higher one of the two connecting means in the one outer panel means, and wherein the two connecting means of the other outer panel means are disposed substantially one above the other at substantially the same height as the two connecting means of the one outer panel means and more remote from the center panel means.

26. A bag according to claim 25, wherein the connecting means on the inside of the center panel means is located closer to the one outer panel means while the connecting means on the outside of said center panel means is disposed closer to the other outer panel means.

27. A bag according to claim 24, wherein the connecting means on the inside of the center panel means is located closer to the one outer panel means while the connecting means on the outside of said center panel means is disposed closer to the other outer panel means.

28. A bag for use with a bicycle rack having an adjustable load-carrying surface according to claim 1, wherein the disengageable means are operable to effect an increase of the bag from a predetermined smaller size to a predetermined larger size, and wherein the smaller size and the large size correspond approximately to the minimum and maximum size of an adjustable load-carrying surface on a bicycle rack.

29. A bag adapted to be changed at will from a predetermined larger size into a predetermined smaller size and vice versa, which comprises a plurality of panel means, disengageable connecting means on said panel means for increasing and again decreasing the size of the bag by disengaging and re-engaging again the connecting means including means for so folding some of said panel means that the predetermined smaller size bag is realized by folding some of said panel means in overlapping relationship and by re-engaging said connecting means, said disengageable connecting means being so located on insides and outsides of respective panel means that the predetermined smaller size bag is realized by folding some of said panel means and engaging said connecting means.

30. A bag according to claim 29, wherein said bottom panel includes a number of stiffening pockets.

31. A bag according to claim 30, wherein one of the bottom stiffening pockets is pivotally secured to the bottom panel while at least another bottom stiffening pocket adjacent said one stiffening pocket is substantially fixedly secured to said bottom panel so that said one bottom stiffening pocket can be pivoted from a position adjacent the at least another bottom stiffening pocket corresponding to the larger size bag condition to overlap with said at least another bottom stiffening pocket in the smaller size bag condition.

32. A bag according to claim 31, wherein said one bottom stiffening pocket is located between two other bottom stiffening pockets.

33. A bag according to claim 31, wherein three bottom stiffening pockets are provided which are at least of approximately the same dimensions.

34. A bag adapted to be changed at will from a predetermined larger size into a predetermined smaller size and vice versa, which comprises a plurality of panel means, disengageable connecting means on said panel means for increasing and again decreasing the size of the bag by disengaging and re-engaging again the connecting means including means for so folding some of said panel means that the predetermined smaller size bag is realized by folding some of said panel means in overlapping relationship and by re-engaging said connecting means, wherein the bag has four sides with two oppositely disposed sides being formed by folded-over panel means in the smaller size bag, and wherein each of said folded over panel means is provided with at least one connecting means.

35. A bag according to claim 34, wherein some of said connecting means are located on the outer surface of the respective panel means and at least another of said connecting means is located on the inner surface of the respective panel means.

36. A bag according to claim 35, wherein one connecting means on each panel means is located at substantially the same panel height.

37. A bag according to claim 35, wherein some panel means include two connecting means located one above the other.

38. A bag adapted to be repeatedly changed from a predetermined larger size into a predetermined smaller size and vice versa, which comprises a plurality of panel means and disengageable connecting means on said panel means, said disengageable connecting means being so located on a side of the panel means on respective insides and outside thereof that the predetermined smaller size bag is realized by folding said panel means and engaging said connecting means.

39. A bag according to claim 38, wherein for realizing said predetermined smaller size bag, said side panel means are so folded as to reduce the arc thereof, as viewed in plan view, by about one-third, and wherein the predetermined larger size bag is realized by disengaging said connecting means and unfolding of said panel means.

40. A bag according to claim 38, wherein said panel means include a front panel, a rear panel, two side panels and a bottom panel.

41. A bag according to claim 40, wherein said front, rear and side panels form a bag of substantially rectangular configuration and wherein each of said panels is of substantially rectangular shape.

42. A bag according to claim 40, wherein said side panels are of larger two-dimensional area than said front and rear panels in the unfolded larger bag size condition, and wherein, in the folded-together smaller bag size, the side panels thereof occupy about the same two-dimensional area as said front and rear panels in the larger bag size.

43. A bag according to claim 40, wherein said side panels include stiffening means which include a number of stiffening pockets adapted to receive stiffening members made of stiffening sheet material and operable to form in effect fold lines.

44. A bag according to claim 43, wherein each side panel has four stiffening pockets, of which the two innermost stiffening pockets are each about one-half the length of each of the outermost stiffening pockets and wherein said stiffening pockets have a height smaller than the height of said side panels.

45. A bag according to claim 40, wherein said bottom panel includes a number of stiffening pockets, and wherein one of the bottom stiffening pockets is movably secured to the bottom panel while at least another bottom stiffening pocket adjacent said one stiffening pocket is substantially fixedly secured to said bottom panel so that said one bottom stiffening pocket can be moved from a position adjacent the at least another bottom stiffening pocket in the larger size bag condition to overlap with said at least another bottom stiffening pocket in the smaller size bag condition.

46. A bag according to claim 45, wherein three bottom stiffening pockets are provided which are at least of approximately the same dimensions and wherein said one bottom stiffening pocket is located between two adjacent bottom stiffening pockets.

47. A bag according to claim 45, wherein said one bottom stiffening pocket is pivotally secured to the bottom panel and is provided with disengageable connecting means along its edge area opposite the side forming the pivot axis and adapted to engage with a disengageable connecting means provided on the surface of the bottom stiffening pocket next to said edge area.

\* \* \* \* \*